(12) United States Patent
Yoshizawa et al.

(10) Patent No.: US 9,990,109 B2
(45) Date of Patent: Jun. 5, 2018

(54) INFORMATION DISPLAY TERMINAL

(71) Applicant: Hitachi Maxell, Ltd., Ibaraki-shi, Osaka (JP)

(72) Inventors: Kazuhiko Yoshizawa, Ibaraki (JP); Nobuo Masuoka, Ibaraki (JP); Masayuki Hirabayashi, Ibaraki (JP); Motoyuki Suzuki, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 230 days.

(21) Appl. No.: 14/898,903

(22) PCT Filed: Jun. 17, 2013

(86) PCT No.: PCT/JP2013/066542
§ 371 (c)(1),
(2) Date: Dec. 16, 2015

(87) PCT Pub. No.: WO2014/203301
PCT Pub. Date: Dec. 24, 2014

(65) Prior Publication Data
US 2016/0162139 A1    Jun. 9, 2016

(51) Int. Cl.
*G06F 15/00* (2006.01)
*G06F 13/00* (2006.01)
(Continued)

(52) U.S. Cl.
CPC ............ *G06F 3/0483* (2013.01); *G06F 3/013* (2013.01); *G06F 3/0485* (2013.01); *G06F 3/0488* (2013.01)

(58) Field of Classification Search
CPC ............................ G06F 17/21; G06F 17/30595
(Continued)

(56) References Cited

U.S. PATENT DOCUMENTS 7,593,605 B2 *  9/2009  King .................. H04N 1/00244
                                                    382/229
7,865,817 B2 *  1/2011  Ryan ..................... G06F 17/211
                                                    715/206
(Continued)

FOREIGN PATENT DOCUMENTS

JP        03-189724 A     8/1991
JP        11-085452 A     3/1999
(Continued)

OTHER PUBLICATIONS

International Search Report of PCT/JP2013/066542.
(Continued)

*Primary Examiner* — Kevin Nguyen
(74) *Attorney, Agent, or Firm* — Mattingly & Malur, PC

(57) ABSTRACT

An information display terminal achieves a suitable display of types of electronic content such as electronic books with a display unit, an operation unit for receiving an operation instruction directed to the information display terminal, and a scroll control unit for controlling the operation for automatic scroll processing of the electronic content displayed on the display unit. An operation instruction instructing initiation of the automatic scroll processing is input to the operation unit, the scroll control unit performs control to initiate automatic scroll processing by which the electronic content displayed on the display unit is displayed in such a manner that the electronic content is moved a predetermined distance per predetermined time period; and when an operation instruction instructing interruption of the automatic scroll processing is input to the operation unit, the scroll control unit performs control to interrupt the automatic scroll processing.

12 Claims, 13 Drawing Sheets

(51) Int. Cl.
  *G06F 3/0483* (2013.01)
  *G06F 3/0488* (2013.01)
  *G06F 3/0485* (2013.01)
  *G06F 3/01* (2006.01)

(58) Field of Classification Search
  USPC .......................................... 715/733, 713, 255
  See application file for complete search history.

(56) References Cited

U.S. PATENT DOCUMENTS

| | | | | |
|---|---|---|---|---|
| 7,887,460 | B2* | 2/2011 | Maschke | A63B 24/00 |
| | | | | 482/8 |
| 8,423,889 | B1* | 4/2013 | Zagorie | G06F 17/21 |
| | | | | 715/255 |
| 9,158,741 | B1* | 10/2015 | Hansen | G06F 3/0488 |
| 9,665,529 | B1* | 5/2017 | Lattyak | G06F 15/0291 |
| 2010/0281364 | A1* | 11/2010 | Sidman | G06F 17/30595 |
| | | | | 715/713 |
| 2011/0261030 | A1* | 10/2011 | Bullock | G06F 15/0283 |
| | | | | 345/204 |
| 2012/0113019 | A1* | 5/2012 | Anderson | G06F 1/1616 |
| | | | | 345/173 |
| 2012/0311623 | A1* | 12/2012 | Davis | H04N 5/765 |
| | | | | 725/18 |
| 2013/0151974 | A1* | 6/2013 | Cho | G06F 17/212 |
| | | | | 715/733 |
| 2015/0026176 | A1* | 1/2015 | Bullock | G06F 17/3064 |
| | | | | 707/736 |
| 2015/0074397 | A1* | 3/2015 | Dube | G06F 21/10 |
| | | | | 713/168 |

FOREIGN PATENT DOCUMENTS

| | | |
|---|---|---|
| JP | 2001-282414 A | 10/2001 |
| JP | 2008-020674 A | 1/2008 |

OTHER PUBLICATIONS

'Miru"Insatsu suru" Tsukuru' ga Jiyu Jizai PDF Marugoto Rikai, Nikkei PC Beginners, Jun. 13, 2009, vol. 14, No. 12, pp. 42-43.
Nikkei BP Soft Press, Hitome de Wakaru Microsoft Windows Vista & 2007 Office system Trouble Kaisetsujutsu, 1st edition, Nikkei BP Soft Press, Sep. 22, 2008, pp. 156-157.
Windows User no Tameno PDF&Acrobat7.0 Nyumon, 1st edition, Ohmsha, Ltd., Apr. 25, 2005, pp. 20-23.

* cited by examiner

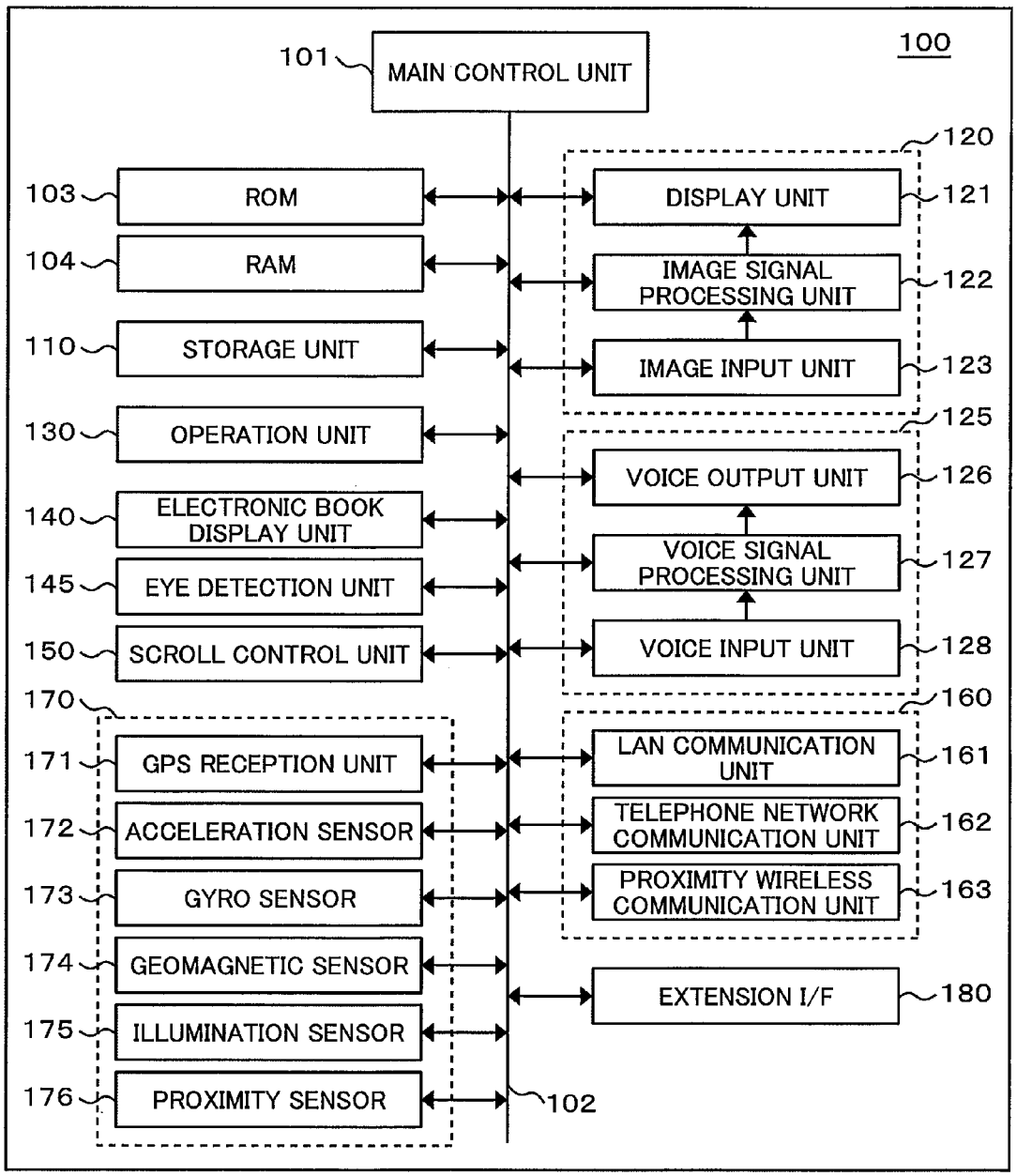
F I G. 1A

F I G. 1 B
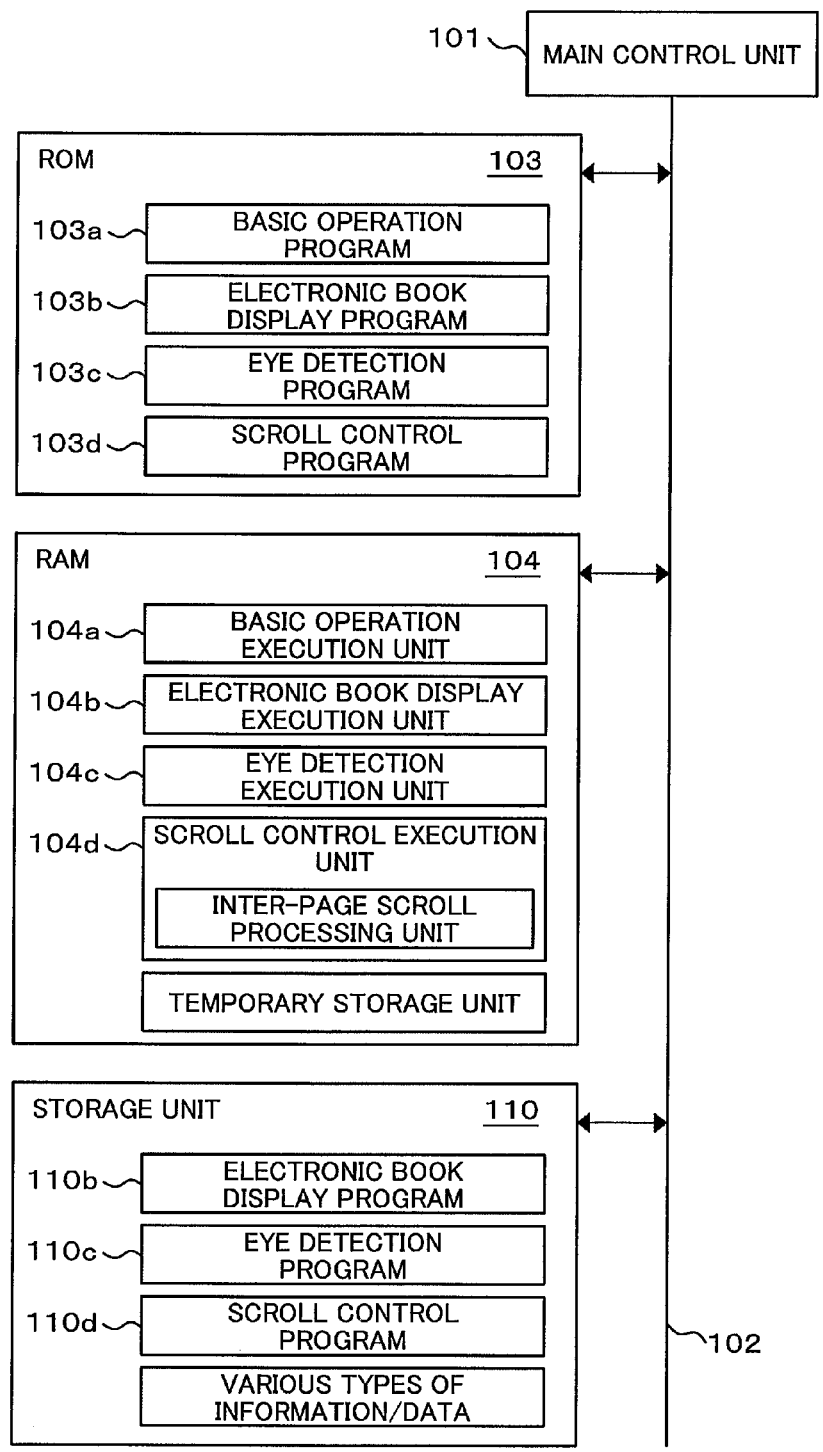

F I G. 4A
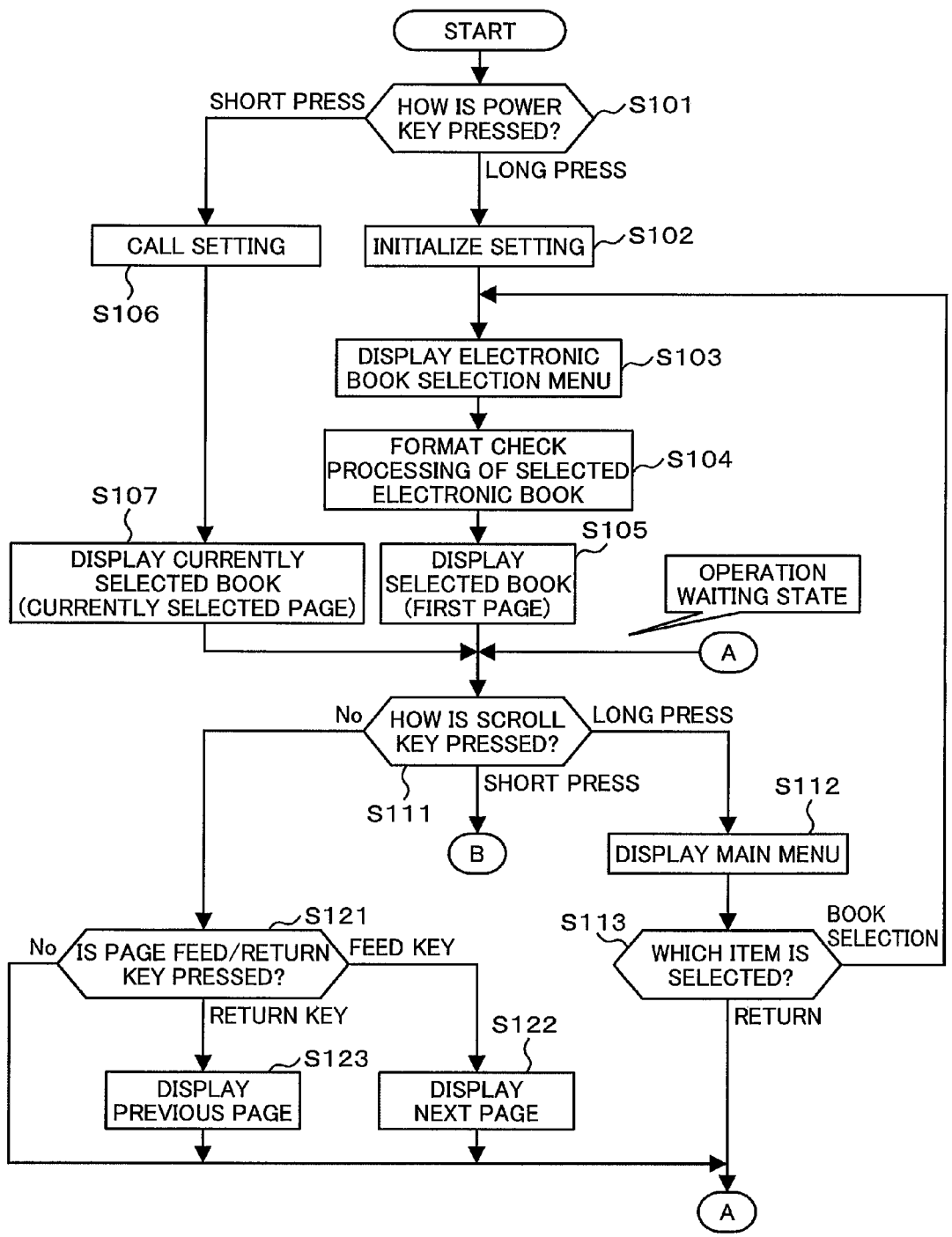

F I G. 7
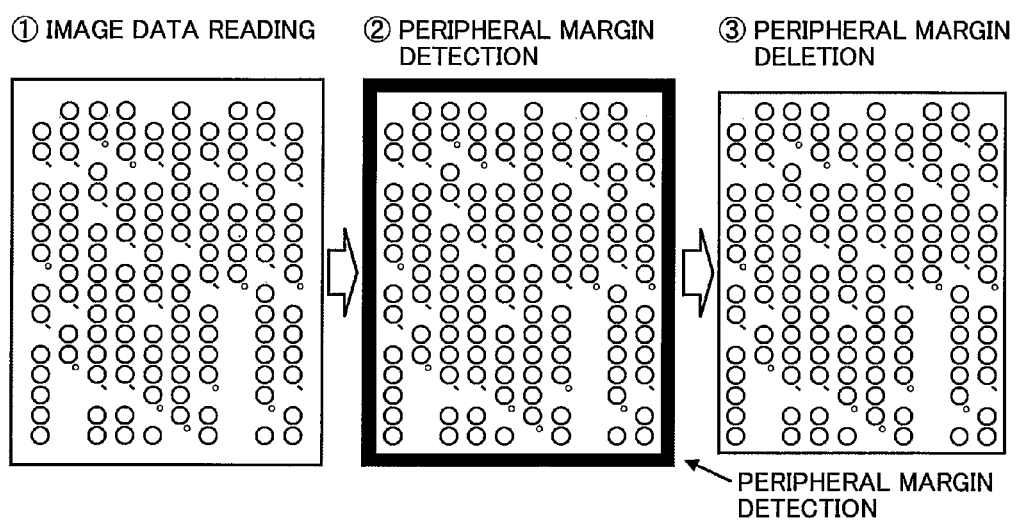

MARGIN DELETION PROCESSING: NO

GAP: LARGE

MARGIN DELETION PROCESSING: YES

GAP: SMALL

IN THE CASE OF VERTICAL WRITING

IN THE CASE OF HORIZONTAL WRITING

INFORMATION DISPLAY TERMINAL

TECHNICAL FIELD

The present invention relates to an information display terminal capable of displaying types of electronic content such as electronic books.

BACKGROUND ART

The distribution of the so-called electronic books has been increasing in recent years. Along with this trend, a large number of dedicated/general-purpose information display terminals capable of displaying electronic books have been available on the market. When an electronic book is displayed on the information display terminal, a function for performing page feed/return is typically used through an operation instruction to a predetermined operation key or touch panel, instead of the action of displaying texts in predetermined unit of page and turning over a page of a printed book. Further, there is also proposed a technique that is capable automatically performing the page feed and reporting the timing at which the page feed is performed, as disclosed in the following Patent Literature 1.

The technique of the following Patent Literature 1 is a technique that "includes standard page feeding time acquisition means for acquiring a standard page feeing time, a counter for counting the time, input means for providing input to delay the timing of the page feed, and page feed means for performing the control of the page feed, in which the page feed means controls the timing of the page feed according to the output of the standard page feeding time acquisition means, the output of the counter, and the output of the input means" and, further, is a technique that "includes standard page feeding time acquisition means for acquiring a standard page feeding time, a counter for counting the time, page feed means for performing the control of the page feed, and progress report means for reporting the progress of the time until the page feed is started by the page feed means". It is described that, by applying the technique described above, "the progress state is displayed in an electronic book display device provided with an automatic page feed function and a slide show function, allowing the timing of the page feed to be easily understandable and as a result the timing of the page feed can easily be extended in response to the output of the operation unit".

CITATION LIST

Patent Literature

Patent Literature 1: Japanese Patent Application Publication No. 2008-20674

SUMMARY OF THE INVENTION

Technical Problem

The information display terminal for displaying electronic books in unit of page as described above has advantages such as that the user can see the same display layout as that of printed books and can enjoy the atmosphere of reading turning over each page by hand. At the same time, the information display terminal has problems such as that it is difficult to see the parts before and after the focused text at once in the vicinity of the page boundary. Note that this problem may not be solved even by the technique described in Patent Literature 1.

The purpose of the present invention is to provide an information display terminal capable of achieving a more suitable display of types of electronic content such as electronic books, by taking into account both the advantages and disadvantages described above.

Solution to Problem

The techniques described in the scope of claims are used as solution to the problems.

One example is an information display terminal capable of displaying an electronic book, which is characterized by including a display unit for displaying a page image of the electronic book, an operation unit for inputting an operation instruction directed to the information terminal, and an inter-page scrolling unit for performing control of scroll processing in such a way that a part of the page image of a page different from the page image of the electronic book, which is displayed on the display unit before the execution of the scroll processing, is displayed on the display unit after the execution of the scroll processing.

Advantageous Effects of Invention

By using the techniques of the present invention, it is possible to provide an information display terminal capable of achieving a more suitable display of types of electronic content including electronic books.

BRIEF DESCRIPTION OF DRAWINGS

FIG. 1A is a block diagram of an information display terminal according to an embodiment.

FIG. 1B is a software configuration diagram of the information display terminal according to the embodiment.

FIG. 4A is a flow chart illustrating the operation of the information display terminal according to the embodiment.

FIG. 7 is a conceptual diagram illustrating margin deletion processing according to the embodiment.

DESCRIPTION OF EMBODIMENTS

Figure 2:
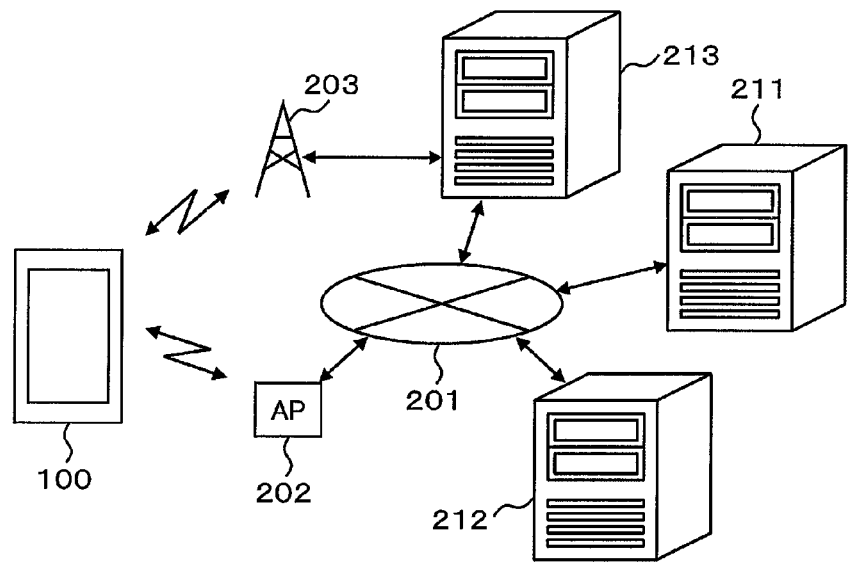
FIG. 2 is a configuration diagram of a communication system including the information display terminal according to the embodiment.

Hereinafter, examples of embodiments of the present invention will be described with reference to the accompanying drawings.

First Embodiment

FIG. 1A is a block diagram of an information display terminal of this embodiment. An information display terminal 100 includes a main control unit 101, a system bus 102, a ROM 103, a RAM 104, a storage unit 110, an image processing section 120, a voice processing section 125, an operation unit 130, an electronic book display unit 140, an eye detection unit 145, a scroll control unit 150, a communication processing section 160, a sensor section 170, and an extension interface unit 180.

FIG. 1B is a software configuration diagram of the information display terminal 100 of this embodiment, which shows the software configuration in the ROM 103, the RAM 104, and the storage unit 110. The details will be described below.

FIG. 2 is a configuration diagram of a communication system including the information display terminal 100 of this embodiment. The communication system is provided with the information display terminal 100, a wide area public network 201 such as the Internet, a wireless communication access point 202 of the wide area public network 201, a mobile telephone communication network base station 203, an application server 211, an electronic book data server 212, and a mobile telephone communication server 213.

The information display terminal 100 can be an electronic book reader or other devices such as a mobile phone or smartphone, a tablet terminal. Further, it can be a PDA (Personal Digital Assistants) or a notebook type PC (Personal Computer). The information display terminal 100 can also be a television, a handheld gaming device, and the like equipped with a communication function and an electronic book display function, or other potable digital devices.

The main control unit 101 is a microprocessor unit that controls the entire information display terminal 100 according to a given program. The system bus 102 is a data communication path for transmitting and receiving data between the main control unit 101 and the respective parts of the information display terminal 100.

The ROM (Read Only Memory) 103 is a memory in which the basic operation program of the information display terminal 100 and other programs, such as the operating system and given application software, are stored. For example, a rewritable ROM such as EEPROM (Electrically Erasable Programmable ROM) or a flash ROM is used. It is assumed that the upgrading and functional expansion of the basic operation programs are possible by updating the program stored in the ROM 103. Note that the ROM 103 can also be configured by using a part of the storage area within the storage unit 110, instead of being configured independently as shown in FIG. 1. The RAM (Random Access Memory) 104 is used as a work area for executing the basic operation program and other programs. More specifically, for example, a basic operation execution unit 104a is configured in such a way that the basic operation program 103a stored in the ROM 103 is developed in the ROM 104 and then the main control unit 101 executes the developed basic operation program. Further, the RAM 104 is provided with a temporary storage unit for temporarily storing data as needed, in the execution of various programs. The ROM 103 and the RAM 104 may be integrally formed with the main control unit 101.

The storage unit 110 stores various operation setting values of the information display terminal 100, the information of the user of the information display terminal, and the like. Further, it is assumed that the functional expansion is achieved in the information display terminal 100 by downloading new application software through the Internet 201 and the wireless communication access point 202, or through the mobile telephone communication network base station 203. At this time, the downloaded new application software is stored in the storage unit 110. It is assumed that the information display terminal 100 can achieve various new functions when the new application software stored in the storage unit 110 is developed and executed on the RAM 104. Further, it is assumed that the storage unit 110 can also store data of electronic books downloaded from the electronic data server 212.

The whole or part of the function of the ROM 103 can be replaced by a part of the area of the storage unit 110. Further, the storage unit 110 has to hold the stored information even if the information display terminal 100 is not supplied with power. Thus, for example, a flash ROM, a SSD (Solid State Drive), a HDD (Hard Disc Drive), or other devices are used.

The image processing section 120 is provided with a display unit 121, an image signal processing unit 122, and an image input unit 123. The display unit 121 is a display device such as a liquid crystal panel that provides an image signal processed by the image signal processing unit 122 to the user of the information display terminal 100. The image signal processing unit 122 is provided with a video RAM, not shown, and drives the display unit 121 based on the image data input to the video RAM. Further, it is assumed that the image signal processing unit 122 is provided with a function to perform format conversion, overlapping of menus and other OSD (On Screen Display) signals, or other processing as needed. The image input unit 123 is a camera for inputting image data of the environment and object by converting the light input from the lens into an electrical signal.

The voice processing section 125 is provided with a voice output unit 126, a voice signal processing unit 127, and a voice input unit 128. The voice output unit 126 is a speaker that provides a voice signal processed by the voice signal processing unit 127 to the user of the information display terminal 100. The voice input unit 128 is a microphone that converts the voice of the user, and the like, into voice data and inputs the voice data.

The operation unit 130 is an instruction input unit for inputting the operation instructions directed to the information display terminal 100. In the present embodiment, it is assumed that the operation unit 130 is configured with a touch panel 130t that is placed on the display unit 121 as well as an operation key 130*k* with button switches. It may also be configured with either the touch panel 130*5* or the operation key 130*k*. The operation of the information display terminal 100 may be done by using a keyboard, and the like, connected to the extension interface unit 180 which will be described below. Further, the display unit 121 may also be provided with the touch panel function.

Figure 3:
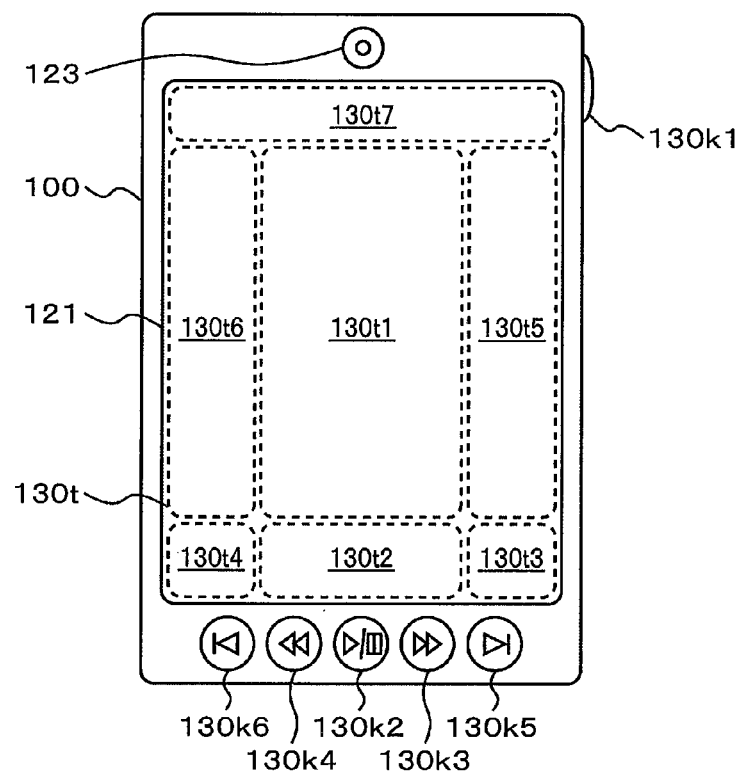
FIG. 3 is an appearance view of the information display terminal according to the embodiment.

FIG. 3 shows an outline diagram of the information display terminal 100 of this embodiment. Note that it is assumed that the information display terminal 100 of this embodiment is an electronic book reader that is dedicated to displaying electronic books, and is provided with a power key 130*k*1, a scroll key 130*k*2, an acceleration key 130*k*3, a deceleration key 130*k*4, a page feed key 130*k*5, and a page return key 130*k*6.

The power key 130*k*1 is used to control the ON/OFF of the main power supply of the information display terminal 100 by a long press, and control the setting/release of the sleep mode of the information display terminal 100 by a short press. The scroll key 130*k*2 is used to display the main menu by a long press, and control the start/stop of the automatic scroll processing of the image displayed on the display unit 121 by a short press. The acceleration key 130*k*3 and the deceleration key 130*k*4 can be pressed during the execution of the automatic scroll processing in order to adjust the scrolling speed. The page feed key 130*k*5 and the page return key 130*k*6 are pressed while the automatic scrolling processing is stopped in order to control the image of the electronic book displayed on the display unit 121 in unit of page.

Note that, in the present embodiment, the term "long press" means the action of holding a target operation key pressed down and releasing the operation key after a predetermined period of time or longer has elapsed. On the other hand, the term "short press" means the action of releasing a target operation key immediately after the operation key is pressed down. If there is no distinction in the pressing action between "long press" and "short press", the action is simply referred to as "press".

It is also possible that the function of the respective operation keys 130*k*2 to 130*k*6 is achieved by a tap operation on a predetermined area of the touch panel 130*t*. For example, the main menu is displayed by a tap operation on the touch area 130*t*1 shown in FIG. 3 while the electronic book is displayed. The start/stop of the automatic scroll processing of the image displayed on the display unit 121 is controlled by a tap operation on the touch area 130*t*2. The scrolling speed is adjusted by a tap operation on the touch area 130*t*3 or the touch area 130*t*4 during the execution of the automatic scroll processing. The image of the electronic book displayed on the display unit 121 is controlled in unit of page by a tap operation on the touch area 130*t*5 or the touch area 130*t*6, while the automatic scroll processing is stopped.

Note that when the information display terminal 100 is a general-purpose device such as a smartphone or a tablet terminal without having the respective operation keys 130*k*2 to 130*k*6, it is also possible to perform an operation on the currently displayed electronic book only by a touch operation on the touch panel 130*t*. Further, when no electronic book is displayed, different functions can be assigned to the respective operation keys and touch areas of the operation unit 130.

In the block diagram shown in FIG. 1, when displaying types of electronic content such as electronic books by the information display terminal 100, the electronic book display unit 140 performs display control of the electronic content in collaboration with other configurations. Note that instead of control by the electronic book display unit 140, it is possible to perform control by the electronic book display execution unit 104 that is configured by developing the electronic book display program 103*b* or 110*b* stored in the ROM 103 or in the storage unit 110 onto the RAM 104 and by executing the developed electronic book display program by the main control unit 101.

The eye detection unit 145 analyzes the face image of the user of the information display terminal 100 that is input by the image input unit 123 to detect the eye movement of the user. Note that known techniques can be used as a method to detect the eye movement, and a detailed description thereof will be omitted in this embodiment. Further, instead of control by the eye detection unit 145, it is possible to perform control by an eye detection execution unit 104*c* that is configured by developing the eye detection program 103*c* or 11*c* stored in the ROM 103 or in the storage unit 110 onto the RAM 104 and by executing the developed eye detection program by the main control unit 101.

The scroll control unit 150 controls in particular the operation in the execution of the scroll processing, with respect to the image of the electronic book displayed on the display unit 121, in response to an operation instruction input to the operation unit 130, or in response to an action such as the eye movement of the user of the information display terminal 100 that is detected by the eye detection unit 145. Note that instead of control by the scroll control unit 150, it is possible to perform control by a scroll control execution unit 104*d* that is configured by developing a scroll control program 103*d* or 110*d* stored in the ROM 103 or in the storage unit 110 onto the RAM 104 and by executing the developed scroll control program by the main control unit 101. Note that with respect to the inter-page scroll processing described below in FIG. 6, it is assumed that the control is performed, in particular, by an inter-page scroll processing unit included in the scroll control execution unit 104*d* or by an inter-page scroll control unit (not shown) included in the scroll control unit 150.

The communication processing section 160 is provided with a LAN communication unit 161, a mobile telephone network communication unit 162, and a proximity wireless communication unit 163. The LAN communication unit 161 is connected to the wireless communication access point 202 of the Internet 201 by wireless communication to transmit and receive data. The mobile telephone network communication unit 162 performs telephone communication (call) as well as data transmission/reception through wireless communication with the mobile telephone communication network base station 203. The proximity wireless communication unit 163 performs wireless communication in the proximity of the corresponding reader/writer. It is assumed that the LAN communication unit 161, the mobile telephone network communication unit 162, and the proximity wireless communication unit 163 are each provided with an encoding circuit, a decoding circuit, an antenna, and the like.

The sensor section 170 is a group of sensors for detecting the state of the information display terminal 100. In the present embodiment, the sensor section 170 is configured with a GPS (Global Positioning System) reception unit 171, an acceleration sensor 172, a gyro sensor 173, a geomagnetic sensor 174, an illumination sensor 175, and a proximity sensor 176. These sensors make is possible to detect the position, movement, tilt, and direction of the information display terminal 100, brightness of the environment, proximity state of the surroundings, and the like. Other sensors may also be provided.

The extension interface unit 180 is a group of interfaces for expanding the functionality of the information display terminal 100. In the present embodiment, it is assumed that the extension interface unit 180 is configured with a video/voice interface, a USB (Universal Serial Bus) interface, a memory interface, and the like. The video/voice interface inputs video signal/voice signals from an external video/voice output device, and outputs video signal/voice signals to an external video/voice input device. The USB interface is used to perform operations such as connection of the keyboard and other USB devices. The memory interface is used to transmit/receive data with a memory card connected to it.

Note that the configuration example of the information display terminal 100 shown in FIG. 1 includes multiple configurations such as the voice processing section 125 and the sensor section 170 that are not required for this embodiment. However, the effect of the present embodiment will not be impaired even if these configurations are not provided. Further, configurations such as a digital television broadcast reception function and an electronic money payment function, not shown, may also be added.

Hereinafter, the operation in the display of an electronic book in the information display terminal 100 of this embodiment will be described with reference to the follow chart of FIG. 4.

When viewing an electronic book by using the information display terminal 100, the user of the information display terminal 100 starts the information display terminal 100 by pressing the power key 130$k$1. In the present embodiment, the power key 130$k$1 has a function to perform the ON/OFF of the main power supply by a long press and to perform the setting/release of the sleep mode by a short press. For this reason, the main control unit 101 (or the basic operation execution unit 104, and so forth) first checks whether the pressing of the power kay 130$k$1 is done by a long press or a short press (S100).

In S101, when it is determined that the pressing of the power key 130$k$1 is done by a long press, the main control unit 101 initializes the entire information display terminal 100 (S102). Next, the main control unit 101 controls the image signal processing unit 122 in such a way that the electronic book display unit 140 (or the electronic book display execution unit 104$b$, and so forth) displays an electronic book selection menu on the display unit 121 (S103).

The electronic book selection menu is a menu display for the selection of an electronic book to be displayed by the information display terminal 100. The user of the information display terminal 100 is allowed to select a desired electronic book from a list of electronic books stored in the storage unit 110 and/or electronic books stored in the electronic book data server 212, by using the electronic book selection menu.

The user of the information display terminal 100 selects a desired electronic book by using the electronic book selection menu, and then the scroll control unit 150 (or the scroll control execution unit 104$d$, and so forth) refers to the data of the selected electronic book to perform display format check processing of the electronic book (S104). Further, the electronic book display unit 140 controls the image signal processing unit 122 to display the page image of the first page of the selected electronic book onto the display unit 121 (S105).

On the other hand, in S101, when it is determined that the pressing of the power key 130$k$1 is done by a short press, the main control unit 101 releases the sleep mode of the information display terminal 100. At the same time, the electronic book display unit 140 recalls the setting (the name of the currently selected electronic book, the currently displayed page, and the like) in the previous operation, which has been evacuated in the storage unit 110 and the like (S106). If the setting of the previous operation remains in the temporary storage unit on the RAM 104, the process of S106 may be omitted. Further, the electronic book display unit 140 controls the image signal processing unit 122 to allow the page image of a given page (page selected in the previous operation) of the electronic book, which is stored in the recalled setting, to be displayed on the display unit 121 (S107).

Figure 5:
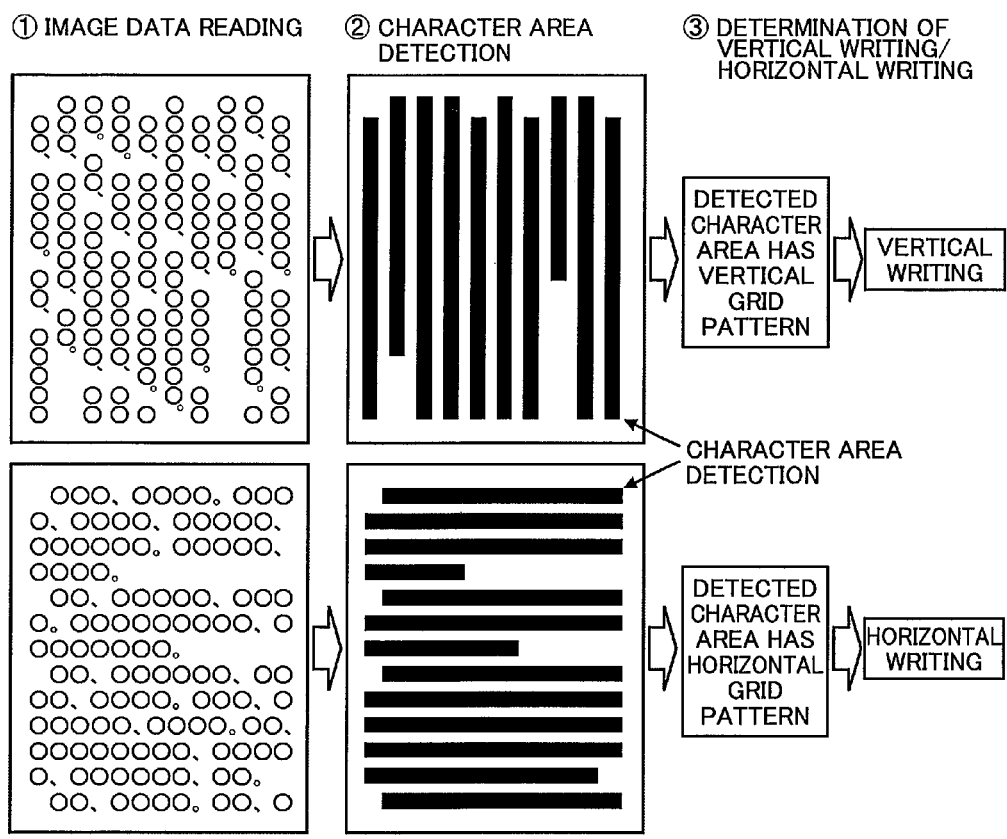
FIG. 5 is a conceptual diagram illustrating display format check processing according to the embodiment.

The display format check processing performed in S104 is a process to determine whether the text display format in the page layout of the electronic book is either vertical writing or horizontal writing. In the information display terminal 100 of this embodiment, as shown in the example of FIG. 5, the process first reads the image data of an electronic book in unit of page. Next, the process detects the character area from the read image data. Then, the process checks whether the detected character area is a vertical grid pattern or a horizontal grid pattern, in order to determine whether the text display format of the electronic book is vertical writing or horizontal wiring. Instead of detecting the character area, it is also possible to detect the margin area including a line space to check whether the detected margin area has a vertical grid pattern or a horizontal grid pattern.

Note that the display format check processing may not be properly performed in some pages such as the front page and pages only with illustrations. For this reason, when the display format check processing is performed, it is desirable to read image data of a plurality of pages except the first page and the last page, and to perform the display format check processing on the plurality of read image data pieces. For example, in the case of an electronic book of 100 pages in total, the display format check processing is performed on the respective image data of the tenth page, the thirtieth page, the fiftieth page, seventieth page, and ninetieth page. If the results in the determination of either vertical writing or horizontal writing are different in each page, the decision can be made by majority.

Further, for example, if the information display terminal 100 is configured to display only electronic books of languages whose text display format is not vertically writing, the display format check processing of S104 may not be performed.

Figure 4B:
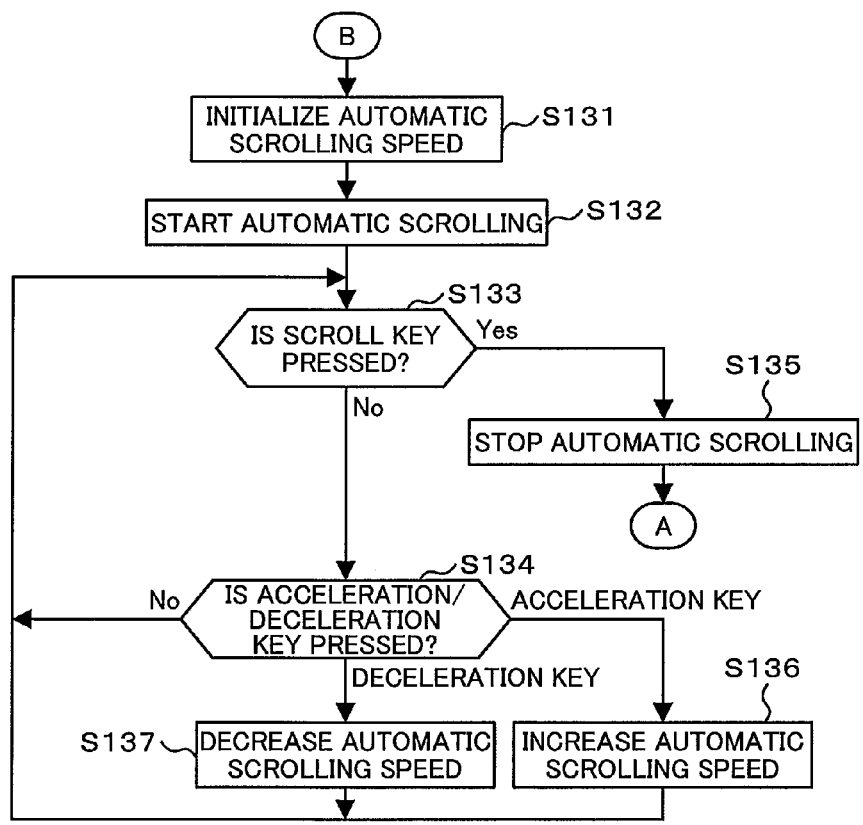
FIG. 4B is a flow chart illustrating the operation of the information display terminal according to the embodiment.
Figure 4C:
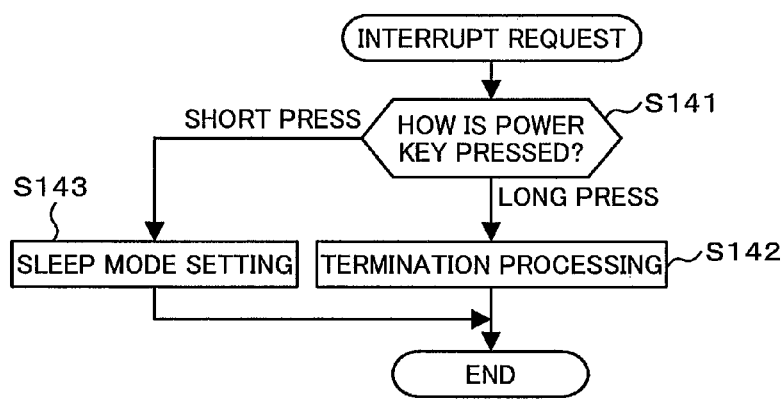
FIG. 4C is a flow chart illustrating the operation of the information display terminal according to the embodiment.

In the flow chart shown in FIG. 4, the page image of a given page of the electronic book is displayed in the process of S105 or S107. In this state, the electronic book display unit 140 waits for an input of an operation instruction to the operation unit 130. Hereinafter, this state will be referred to the "operation writing state". In the operation writing state, the electronic book display unit 140 mainly checks whether or not the scroll key 130$k$2 is pressed (S111) as well as whether or not the page feed key 130$k$5 and the page return key 130$k$6 are pressed (S121). It is also possible to check inputs of operation instructions directed to other configurations (the touch panel 130$t$, and the like) of the operation unit 130, but the description thereof will be omitted here.

When a long press to the scroll key 130$k$2 is confirmed in S111, the electronic book display unit 140 controls the image signal processing unit 122 to display the main menu on the display unit 121 (S112). Further, the electronic book display unit 140 checks which item is selected in the main menu display (S113). When an "electronic book selection menu" item is selected in the main menu display, the electronic book display unit 140 clears the main menu display and displays the electronic book selection menu (by moving to S103). Further, when a "return" item is selected in the main menu display, the electronic book display unit 140 clears the main menu display and moves to the operation waiting state. Note that when any other item is selected in the main menu display, the electronic book display unit 140 performs the function of the selected item and then moves to the main menu display or to the operation waiting state.

When a press of the scroll key 130$k$2 is not confirmed in S111 and when a press of the page feed key 130$k$5 or the page return key 130$k$6 is confirmed in S121, the electronic book display unit 140 performs the processing of displaying the page image of the next page of the page image of the currently displayed electronic book in the operation waiting state (S122: when the page feed key 130$k$5 is pressed), or performs the processing of displaying the page image of the page before the page image of the electronic book (S123: when the page return key 130$k$6 is pressed). After that, the electronic book display unit 140 moves to the waiting state.

Further, it is assumed that the information display terminal 100 of this embodiment is capable of performing the inter-page scroll processing or single-page scroll processing according to the amount of movement of the finger in a swipe (drag) operation in the operation waiting state. In the present embodiment, the inter-page scroll processing is a process that changes the direction of scrolling according to the result of the display format check processing performed in the processing of S104. When it is determined that the text display format of the electronic book currently displayed on the display unit 121 is vertical writing, only the inter-page scroll processing in the horizontal direction is permitted. On the other hand, when it is determined that the text display format of the displayed electronic book is horizontal writing in S104, only the inter-page scroll processing in the vertical direction is permitted.

Figure 6A:
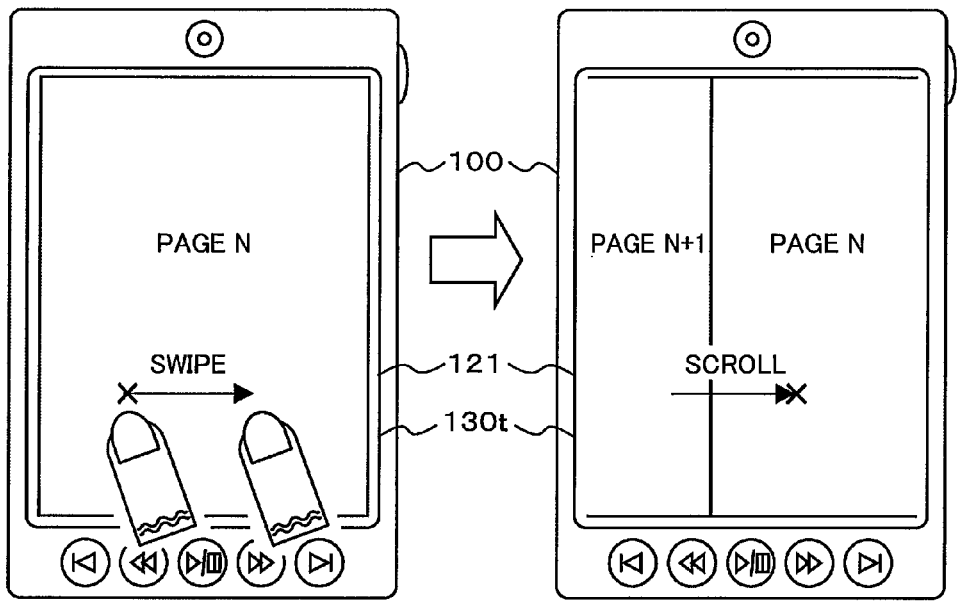
FIGS. 6A and 6B are conceptual diagrams illustrating inter-page scroll processing by a swipe operation according to the embodiment.
Figure 6B:
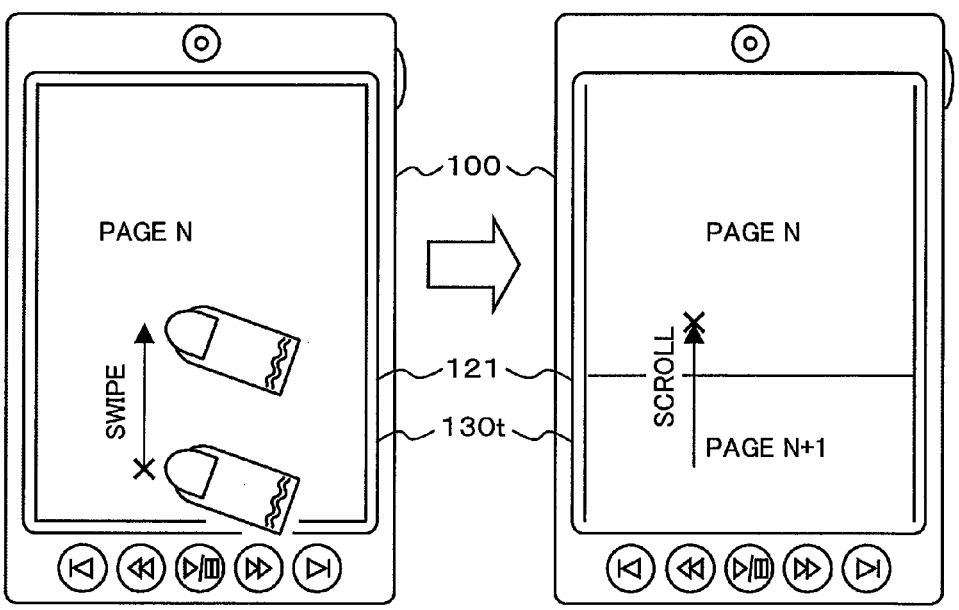

Note that the inter-page scroll processing means, as shown in FIG. 6, a process of scrolling the page image of the electronic book currently displayed on the display unit 121 in such a way that (at least a part of) the page image of a page (page N+1, etc.) different from the page (page N) of the page image, which is displayed before the execution of the scroll processing, is displayed on the display unit. 121 after the execution of the scroll processing. On the other hand, the single-page scroll processing is a process of scrolling the page image in such a way that only the page image of the same page as the page image, which is displayed before the execution of the scroll processing, is displayed on the display unit 121 also after the execution of the scroll processing. Such a single-page scroll processing can typically be allowed in all directions independent of the processing result of S104.

Because of the inter-page scroll processing in the information display terminal 100 of this embodiment, it is possible to display the page images of a plurality of consecutive pages simultaneously on the display unit 121 when the page image of the electronic book currently displayed on the display unit 121 is scrolled by a swipe operation. In other words, it is possible to display texts of different pages continuously and simultaneously. As a result, even if the text is in the vicinity of the page boundary, it is possible to see the parts before and after the text collectively by using the information display terminal 100 of this embodiment.

Further, in the information display terminal 100 of this embodiment, the margin deletion processing is performed in order to display the page image of each page of the electronic book on the display unit 121 as shown in FIG. 7.

The margin deletion processing is a process of deleting the margin of the peripheral portion of the page present in the page layout of the electronic book. More specifically, first the electronic book display unit 140 reads the image data of the electronic book in unit of page. Next, the electronic book display unit 140 detects the margin area except the text area from the read image data. Then, the electronic book display unit 140 deletes only the peripheral margin area except the margin present in the line space, with respect to the detected margin area. Note that the detection processing of the margin area may be performed together with the display format check processing of S104.

Figure 8A:
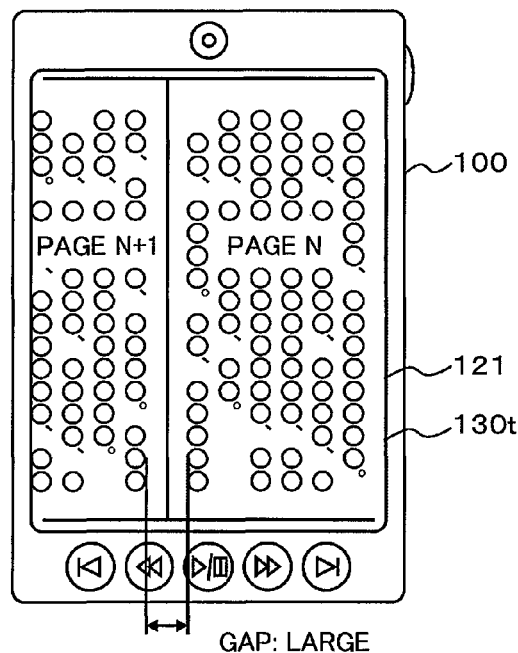
FIGS. 8A and 8B are screen display diagrams illustrating the effect of the margin deletion processing according to the embodiment.
Figure 8B:
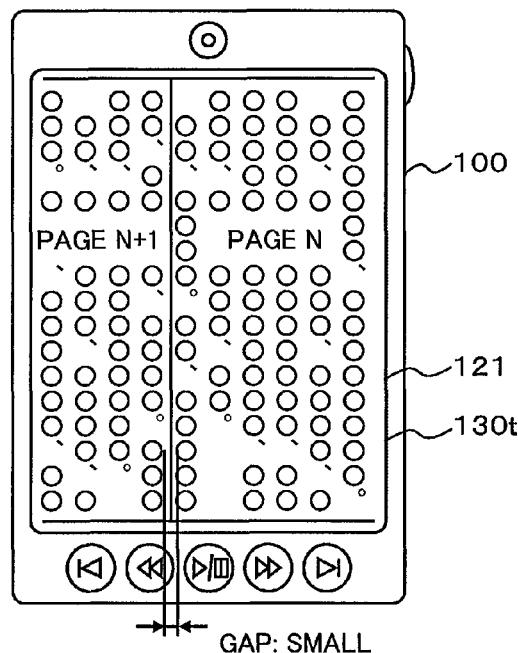

By performing the margin deletion processing when the page image of each page of the electronic book is displayed on the display unit 121, it is possible to prevent a large gap in the line space on the page boundary, as shown in the example of FIG. 8 in which the text display format of the electronic book is vertical writing when the page images of a plurality of consecutive pages are displayed simultaneously on the display unit 121 by the inter-page scroll processing as describe above. As a result, the user of the information display terminal 100 can continuously read the electronic book without being aware of the boundary of each page. In addition, the peripheral margin area can be deleted by the margin deletion processing in such a way that that the line space distance (gap) between lines on the page boundary is approximately equal to the line space distance between lines within the page. In this way, a more desirable display state can be achieved.

Further, in the case of determining that the text display format of the electronic book currently displayed on the display unit 121 is vertical writing according to the processing result of S104, it is also possible to delete only the peripheral margin area on the left and right sides of the peripheral margin area. Similarly, in the case of determining that the text display format of the electronic book currently displayed on the display unit 121 is horizontal writing, it is also possible to delete only the peripheral margin area on the top and bottom sides of the peripheral margin area.

Note that in some pages such as pages only with illustrations, the peripheral margin area may not be detected correctly in the margin deletion processing. In such a case, the user has only to use the information of the peripheral margin area that is detected in the pages before and after the current page.

In the flow chart shown in FIG. 4, when a short press of the scroll key 130$k$2 is confirmed in the processing of S111, the scroll control unit 150 first initializes the information on the speed in the execution of the automatic scroll processing (S131). Then, the electronic book display unit 140 starts the automatic scroll processing by controlling the image display processing unit 122 based on the instruction of the scroll control unit 150 (S132). Further, during the execution of the automatic scroll processing, the electronic book display unit 140 checks whether or not a press of the scroll key 130$k$2 is done (S133) and checks whether or not a press of the acceleration key 130$k$3 and the deceleration key 130$k$6 is done (S134). While it is also possible to check the input of an operation instruction directed to other configurations (the touch panel 130$t$, and the like) of the operation unit 130, a description thereof will be omitted here.

When a press of the scroll key 130$k$2 is confirmed in S133, the electronic book display unit 140 stops the automatic scroll processing by controlling the image display processing unit 122 based on the instruction of the scroll control unit 150 (S135), and returns to the operation waiting state. When a press of the scroll key 130$k$2 is not confirmed in S133 and when a press of the acceleration key 130*k*3 or the deceleration key 130*k*4 is confirmed in S134, the scroll control unit 150 updates the information on the speed in the execution of the automatic scroll processing. More specifically, when a press of the acceleration key 130*k*3 is confirmed in S134, the scroll control unit 150 increases the speed in the execution of the automatic scrolling (S136). On the other hand, when a press of the deceleration key 130*k*4 is confirmed, the scroll control unit 150 decreases the speed in the execution of the automatic scrolling (S137).

Figure 9A:
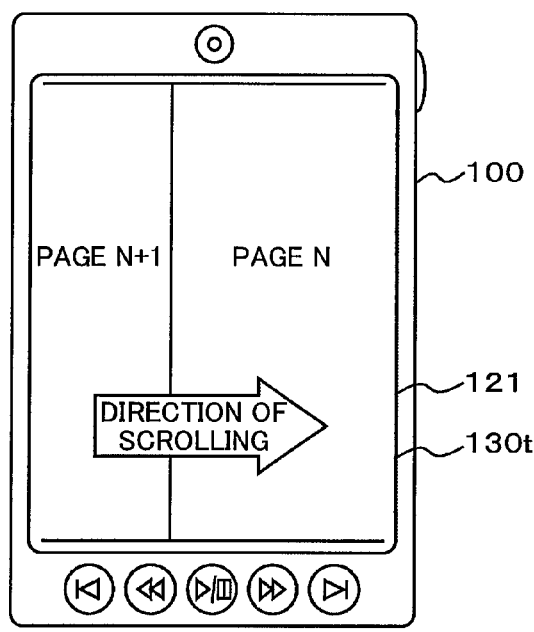
FIGS. 9A and 9B are conceptual diagrams illustrating the direction of scrolling in the automatic scroll processing according to the embodiment.
Figure 9B:
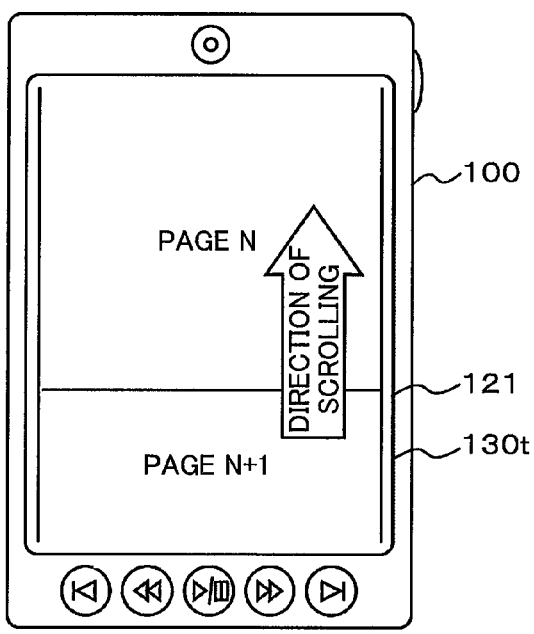

In the automatic scroll processing according to the present embodiment, the inter-page scroll processing is continuously performed independent of the swipe operation, and the like, by the user of the information display terminal 100. Further, as shown in FIG. 9, when it is determined that the text display format of the electronic book currently displayed on the display unit 121 is vertical writing according to the result of the display format check processing performed in S104, the scrolling is performed in such a way that the image information such as text moves from the left to the right within the display unit 121. On the other hand, when it is determined that the text display format of the currently displayed electronic book is horizontal writing in S104, the scrolling is performed in such a way that the image information such as text moves from the bottom to the top.

Figure 10:
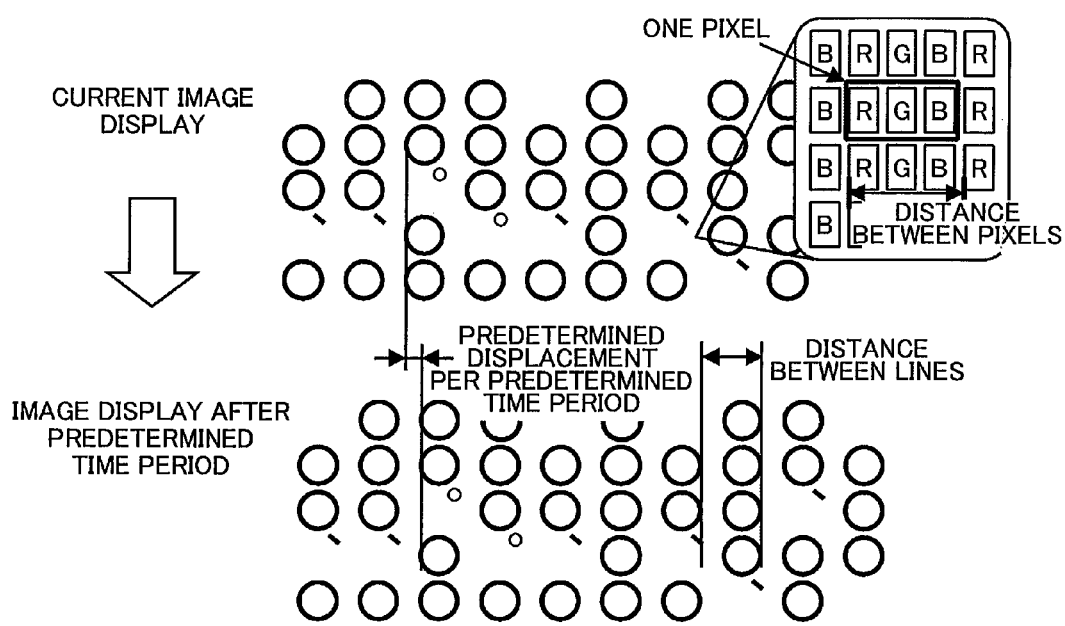
FIG. 10 is a conceptual diagram illustrating the amount of movement in the automatic scroll processing according to the embodiment.

Further, more specifically, the automatic scroll processing is achieved by controlling the image signal processing unit 122 to continuously repeat the processing of displaying the image displayed on the display unit 121 by moving the image for a predetermined amount of movement per predetermined time period. In this case, as shown in FIG. 10, it is desirable that the predetermined amount of movement is equal to or an integral multiple of the distance between pixels of the display device such as a liquid crystal panel configuring the display unit 121, or is equal to the distance between lines of the text of the displayed electronic book or an integral multiple or divisor of it.

Further, it is assumed that the predetermined time period is typically a constant value when a press of the acceleration key 130*k*3 and the deceleration key 130*k*4 is not confirmed. When a press of the acceleration key 130*k*3 is confirmed, the value is changed to a smaller value. When a press of the deceleration key 130*k*4 is confirmed, the value is changed to a larger value. Alternately, even if a press of the acceleration key 130*k*3 and the deceleration key 130*k*4 is not confirmed, the predetermine time period can be controlled in such a way that the value is changed according to the amount of characters in the electronic book within the range displayed in the display unit 121.

Further, it is possible to set the unit time constant value. In this case, the amount of movement per unit time is increased when a press of the acceleration key 130*k*3 is confirmed, while when a press of the deceleration key 130*k*4 is confirmed, the amount of movement per unit time is reduced.

Further, in the information display terminal 100 of this embodiment, it is assumed that the power key 130*k*1 is constantly monitored independent of the processing of the flow chart shown in FIGS. 4A and 4B. In this case, when a press of the power key 130*k*1 is confirmed, an interrupt request is generated. When the interrupt request is generated, the main control unit 101 stops the actual processing and checks whether the pressing of the power key 130*k*1 that causes the interrupt request is done by a long press or a short press (S141). When it is confirmed in S141 that the pressing of the power key 130*k*1 is done by a long press, the main control unit 101 performs the termination processing of the information display terminal 100. Then, the main control unit 101 turns off the main power supply of the information display terminal 100 (S142). On the other hand, when it is confirmed in S141 that the pressing of the power key 130*k*1 is done by a short press, the main control unit 101 performs processing such as evacuation of the setting stored on the RAM 104 to the storage unit 110. Then, the main control unit 101 puts the information display terminal 100 into the sleep mode (S143).

As described above, the information display terminal 100 of this embodiment is capable of scrolling the page image of the electronic book currently displayed on the display unit 121 through an operation such as swipe, by performing a series of processing steps shown in the flow chart of FIG. 4. Further, when the page image of the electronic book currently displayed on the display unit 121 is scrolled through an operation such as swipe, the texts described in different pages can be displayed continuously and simultaneously. As a result, even if the text is in the vicinity of the page boundary, the parts before and after the text can be seen collectively. In addition, because of the automatic scroll processing, it is possible to continuously read the electronic book currently displayed on the display unit 121 without performing an operation such as swipe. In other words, the information display terminal 100 of this embodiment is capable of providing a more suitable display of electronic books to the user.

Second Embodiment

Hereinafter, a second embodiment of the present invention will be described. Note that it is assumed that the configurations, effects, and other features of this embodiment are the same as those described in the first embodiment unless otherwise specifically stated. Thus, mainly the difference between the present embodiment and the first embodiment will be described below and the description of the common parts will be omitted as much as possible to avoid duplication.

Figure 11:
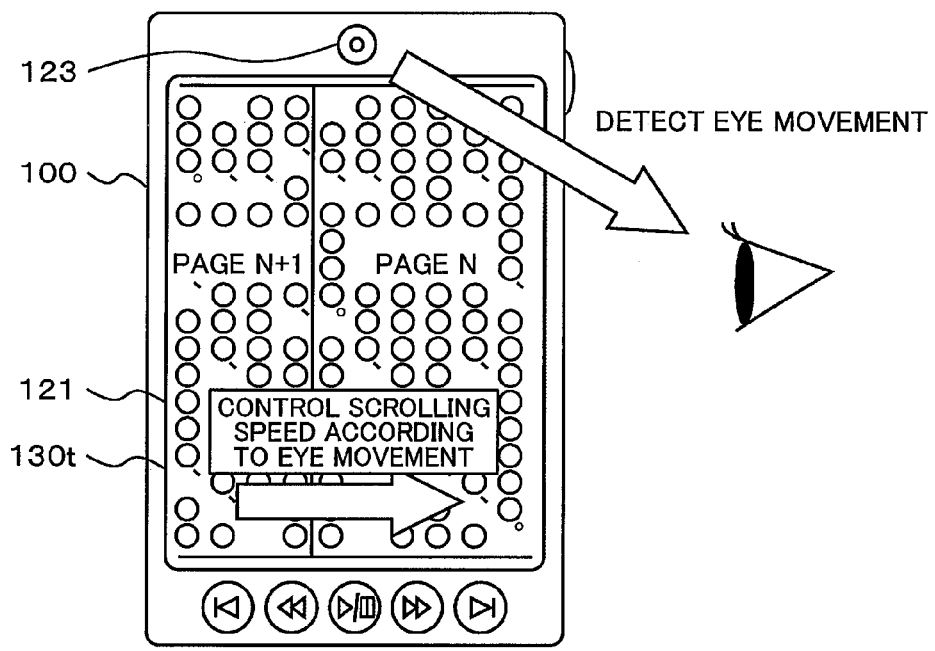
FIG. 11 is a conceptual diagram illustrating the automatic scroll processing in response to the eye movement of the user according to the embodiment.

The first embodiment described above performs the control of the scrolling speed in the execution of the automatic scroll processing based on the instruction of the scroll control unit 150 according to the operation instruction input to the operation unit 130. In other words, the information display terminal 100 of the first embodiment may be configured without the eye detection unit 145 of the block diagram shown in FIG. 1. On the other hand, the information display terminal 100 of this embodiment performs the control of the scrolling speed in the execution of the automatic scroll processing based on the instruction of the scroll control unit 150, according to the eye movement of the user of the information display terminal 100 that is detected by the eye detection unit 145 (or the eye detection execution unit 104*c*, and so forth) as shown in FIG. 11. Incidentally, it goes without saying that the control of the scrolling speed in the execution of the automatic scroll processing can be achieved by the control of the predetermined time period and/or the predetermined amount of movement.

Figure 12:
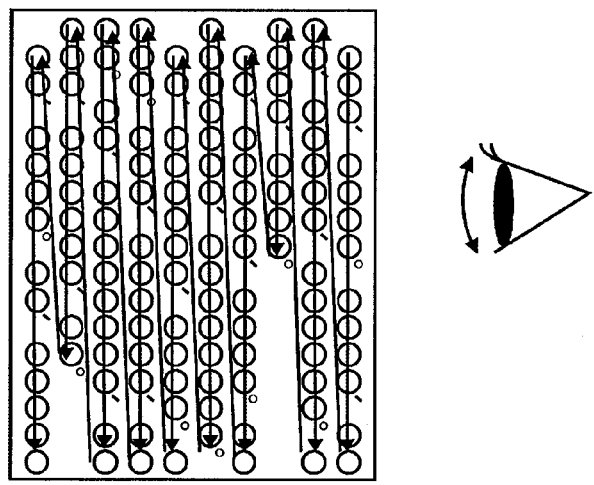
FIG. 12 is a conceptual diagram illustrating the eye movement of the reader when reading a book, according to the embodiment.

The eye of the reader typically moves in each page as indicated by the arrows in FIG. 12 when reading an electronic book whose text display format is vertical writing. At this time, the eye of the reader moves from side to side while repeating up and down movement. In other words, the reader has to perform one up-and-down movement of the eye to read one line of the text of the book. Incidentally, in the case of a book whose text display format is horizontal writing, the reader has to perform one left-and-right movement of the eye to read one line of the text of the book.

In the information display terminal 100 of this embodiment, the eye detection unit 145 analyzes the face image of the user of the information display terminal 100 that is input from the image input unit 123, in order to recognize the eye movement of the user, in particular, the up-and-down movement of the eye (in the case of the electronic book whose text display format is vertical writing, and so forth). Further, the scroll control unit 150 performs the control of the scrolling speed in automatic scroll processing in such a way that the time required for one up-and-down eye movement of the user that the eye detection unit 145 recognizes and the time required for scrolling the line space for one line of the text of the electronic book displayed on the display unit 121 are approximately equal to their average in a predetermined period of time.

By performing the control described above, the speed at which the user of the information display terminal 100 reads the electronic book displayed on the display unit 121 is approximately equal to the speed of the movement when the page image of the electronic book displayed on the display unit 121 is automatically scrolled by the automatic scroll processing. As a result, the user of the information display terminal 100 can continuously read the electronic book displayed on the display unit 121, without performing operations such as inputting an operation instruction intended to change the scrolling speed into the operation unit 130.

Figure 13:
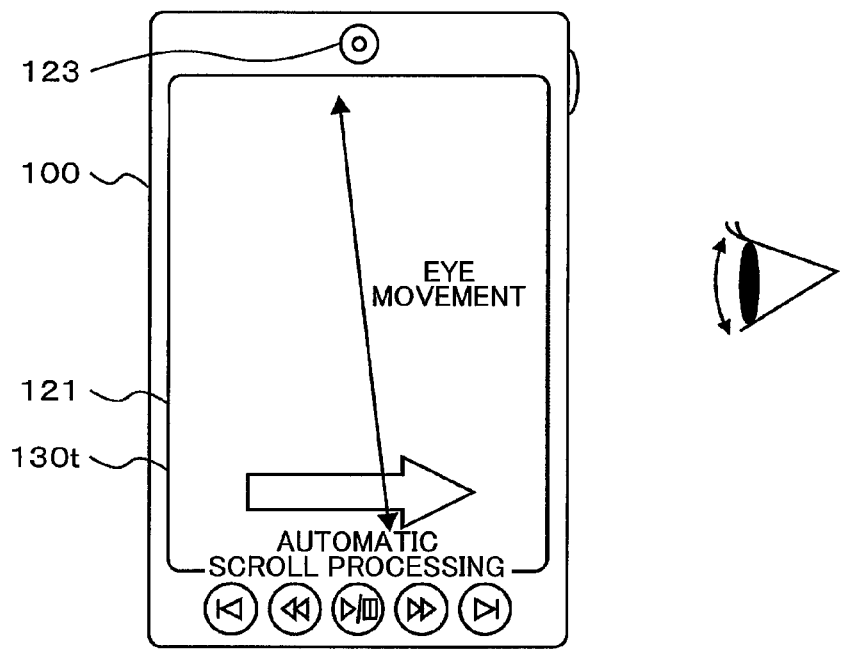
FIG. 13 is a conceptual diagram illustrating the eye movement of the reader in the automatic scroll processing in response to the eye movement the reader, according to the embodiment.

Note that when the control described above is performed, the user of the information display terminal 100 can continuously read the electronic book displayed on the display unit 121 only by moving the eye up and down substantially at the same position on the display unit 121, without moving the eye so much in the horizontal direction. Further, as shown in FIG. 13, the scrolling speed in the execution of the automatic scroll processing is controlled in such a way that the eye movement of the user of the information display terminal 100 is maintained in the vicinity of substantially the central portion of the display unit 121. In this way, it is possible to constantly display the parts before and after the focused text on the display unit 121. As a result, a more desirable display state can be achieved.

Further, when the eye of the user of the information display terminal 100 is determined to be out of the display unit 121 or when the eye movement is unusual such as stopping, it is possible to control temporarily stopping the automatic scroll processing by means of the eye detection processing in the eye detection unit 145. Note that in this case, the automatic scroll processing can be resumed if the eye of the user of the information display terminal 100 is back on the display unit 121.

Figure 14:
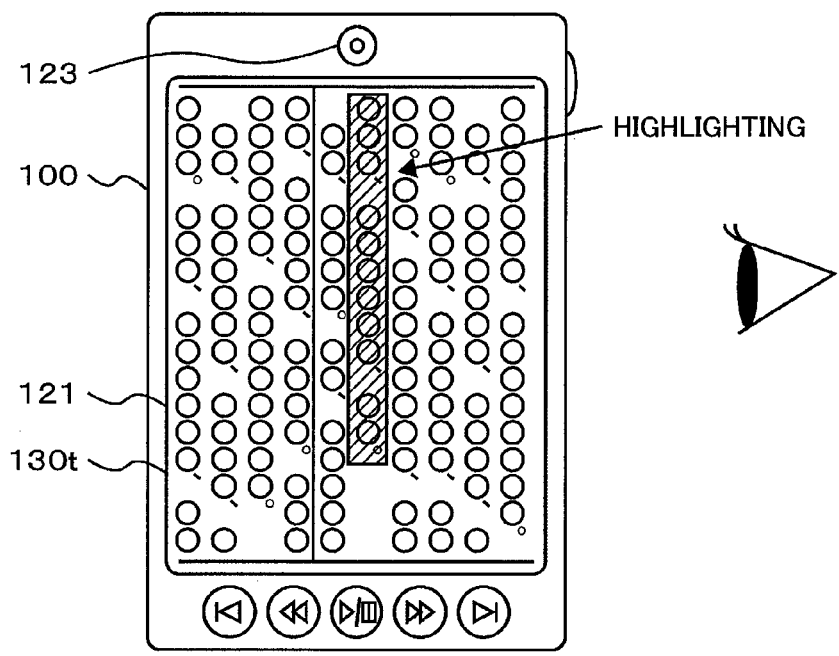
FIG. 14 is a screen display diagram illustrating the highlighting of the focused position according to the embodiment.

Still further, as shown in FIG. 14, it is possible to highlight the part that the user of the information display terminal 100 is expected to see or the part that the user of the information display terminal 100 should see. Examples of the highlighting method are highlight display, enlarged display, and bold display per line or phrase, and the like. In this way, when the user of the information display terminal 100 once removes the eye from the display unit 121 and returns it on the display unit 121, it is possible to immediately identify which part of the electronic book displayed on the display unit 121 the user of the information display terminal 100 has seen just before the removable of the eye of the user.

As described above, in the information display terminal 100 of this embodiment, the speed at which the user of the information display terminal 100 reads an electronic book can be made approximately equal to the scrolling speed of the page image of the electronic book in the execution of the automatic scroll processing, by means of the eye detection processing based on the analysis of the face image of the user of the information display terminal 100. In other words, also in the information display terminal 100 of this embodiment, it is possible to provide a more suitable display of electronic books to the user.

Note that, in the present embodiment, the description has mainly focused on the case of displaying the electronic book whose text display format is vertical writing as an example of the electronic books displayed by the information display terminal 100. However, it goes without saying that the same effect as that described above can also be obtained in the case of displaying the electronic books whose text display format is horizontal writing. Further, the present invention is not limited to the electronic books, and the same effect as that described above can also be obtained when the electronic content mainly configured with characters is displayed in the information display terminal 100.

Further, in the information display terminal 100 of this embodiment, it is also possible to control the scrolling speed in the execution of the automatic scroll processing based on the instruction of the scroll control unit 150 according to the eye movement of the user of the information display terminal 100 that is detected by the eye detection unit 145, and according to the operation instruction input to the operation unit 130.

While examples of embodiments of the present invention have been described using the first and second embodiments, it goes without saying that the configurations that achieve the techniques of the present invention are not limited to the foregoing embodiments. For example, the configuration of one embodiment can be combined with the configuration of the other embodiment. These all belong to the scope of the present invention. Further, the numbers, messages, and other information appearing in the text and figures are merely examples and the effect of the present invention will not be impaired if different values are used.

Further, with respect to the above-described functions and the like of the present invention, some or all of them can be achieved in hardware (the electronic book display unit 140, the eye detection unit 145, the scroll control unit 150, and the like), for example, by a process such as designing using integrated circuits. Further, it is also possible to achieve them in software by interpreting and executing the programs (the electronic book display program 103*b*/110*b*, the eye detection program 103*c*/110*c*, the scroll control program 103*d*/110*d*, and the like) with which the component such as the microprocessor unit performs the respective functions and the like. Note that although the programs may be stored in advance in the ROM 103 or storage unit 110, and the like, of the information display terminal 100, it is also possible to obtain the programs from the application server and the like on the Internet 201 through the LAN communication unit 161 or the mobile telephone network communication unit 162, and to store the programs in the storage unit 110. Further, it is also possible to obtain the programs stored on a memory card or another storage device through the extension interface unit 180. Still further, the programs achieving the functions and the like of the present invention can be configured by a combination of a plurality of programs (103*b* to 103*d* or 110*b* to 110*d*), or can be configured as a single package of the plurality of programs. Note that when the functions and the like of the present invention are achieved in software, the programs can be stored in one of the ROM 103 and the storage unit 110.

Further, the control and information lines shown in the figures are considered to be necessary for explanation and all of the control and information lines on the product are not necessarily shown. It is possible to consider that substantially all the configurations are actually connected to each other.

REFERENCE SIGNS LIST 100 information display terminal
101 main control unit
102 system bus
103 ROM
104 RAM
110 storage unit
120 image processing section
121 display unit
122 image signal processing unit
123 image input unit
125 voice processing section
126 voice output unit
127 voice signal processing unit
128 voice input unit
130 operation unit
130$t$ touch panel
130$k$1 power key
130$k$2 scroll key
130$k$3 acceleration key
130$k$4 deceleration key
130$k$5 page feed key
130$k$6 page return key
140 electronic book display unit
145 eye detection unit
150 scroll control unit
160 communication processing section
161 LAN communication unit
162 mobile telephone network communication unit
163 proximity wireless communication unit
170 sensor section
171 GPS reception unit
172 acceleration sensor
173 gyro sensor
174 geomagnetic sensor
175 illumination sensor
176 proximity sensor
180 extension interface unit
201 Internet
202 access point
203 base station
211 application server
212 electronic book data server
213 mobile telephone communication server

The invention claimed is:

1. An information display terminal capable of displaying an electronic book, the information display terminal comprising:
   a display device configured to display a first page image of the electronic book;
   an operation input device configured to receive an operation instruction directed to the information display terminal; and
   a processor connected to the display device and the operation input device, and programmed to:
   perform control of inter-page scroll processing, with respect to the operation instruction, where a part of a second page image different from the first page image of the electronic book, which is displayed on the display device before the execution of the inter-page scroll processing, is displayed on the display device after the execution of the inter-page scroll processing,
   delete a margin area of at least one of the first and second page images of the electronic book so that a line space distance between lines on a page boundary of the first and second pages is approximately equal to a line space distance between lines within the first and second pages, and
   display the first and second page images of the electronic book on the display device with the margin area of the at least one of the first and second page images having been deleted therefrom.

2. The information display terminal according to claim 1, wherein the operation input device is a touch panel placed on the display unit, and
   wherein the operation instruction is a swipe operation on the touch panel.

3. The information display terminal according to claim 1, wherein the processor is further programmed to:
   check whether a text display format of the electronic book displayed on the display device is vertical writing or horizontal writing, and
   change a direction of scrolling according to the check result of the text display format.

4. An information display terminal capable of displaying electronic content divided into a plurality of page images, the information display terminal comprising:
   a display device configured to display a first page image of the electronic content;
   an operation input device configured to receive an operation instruction directed to the information display terminal; and
   a processor connected to the display device and the operation input device, and programmed to:
   perform automatic scroll processing for a predetermined amount of movement per predetermined time period according to the received operation instruction,
   delete a margin area of a peripheral portion of at least one of the first page image and a second page image of the electronic content a line space distance between lines on a page boundary between the first and second page images is approximately equal to a line space distance between lines within the first and second page images, and
   simultaneously display the first and second images on the display device with the margin area of the peripheral portion of the at least one of the first and second page images having been deleted therefrom.

5. The information display terminal according to claim 4, wherein the processor is further programmed to:
   check whether a text display format of the electronic content displayed on the display unit is vertical writing or horizontal writing, and
   change a direction of scrolling according to the check result of the text display format.

6. The information display terminal according to claim 4, further comprising:
   a camera configured to capture a face image of a user of the information display terminal,
   wherein the processor is further programmed to:
   analyze the face image of the user of the information display terminal to detect an eye movement of the user, and control the predetermined time period and/or the predetermined amount of movement in the execution of the automatic scroll processing according to the detected eye movement of the user.

7. The information display terminal according to claim 6, wherein the processor is further programmed to:

control the predetermined time period and/or the predetermined amount of movement in such a way that the time required for one up-and-down or left-and-right eye movement of the user of the information display terminal is approximately equal to the time required for scrolling an amount of movement for one line in the electronic content displayed on the display device in the execution of the automatic scroll processing according to the detected eye movement of the user.

8. The information display terminal according to claim 6, wherein the processor is further programmed to:

stop the automatic scroll processing when detecting that the eye of the user of the information display terminal is directed outside of the display device during the execution of the automatic scroll processing according to the detected eye movement of the user.

9. The information display terminal according to claim 6, wherein the processor is further programmed to:

highlight characters in a part of the electronic content that the user of the information display terminal is expected to see according to the detected eye movement.

10. The information display terminal according to claim 4, wherein the predetermined amount of movement is equal to or an integral multiple of a distance between pixels in the display device, or is equal to the line space distance between lines in the electronic content displayed on the display device, or an integral multiple or divisor of the line space distance.

11. The information display terminal according to claim 4, wherein the processor is further programmed to:

change the predetermined time period according to an amount of characters in the electronic content displayed on the display device.

12. The information display terminal according to claim 4, wherein the electronic content is an electronic book.

* * * * *